(12) United States Patent
Heidari et al.

(10) Patent No.: US 7,400,668 B2
(45) Date of Patent: Jul. 15, 2008

(54) METHOD AND SYSTEM FOR IMPLEMENTING A SYSTEM ACQUISITION FUNCTION FOR USE WITH A COMMUNICATION DEVICE

(75) Inventors: Ghobad Heidari, San Diego, CA (US); Kuor-Hsin Chang, Sunnyvale, CA (US); Paul L. Master, Sunnyvale, CA (US); Eugene B. Hogenauer, San Carlos, CA (US); Walter James Scheuermann, Saratoga, CA (US)

(73) Assignee: QST Holdings, LLC, Palo Alto, CA (US)

( * ) Notice: Subject to any disclaimer, the term of this patent is extended or adjusted under 35 U.S.C. 154(b) by 870 days.

(21) Appl. No.: 10/067,496

(22) Filed: Feb. 4, 2002

(65) Prior Publication Data

US 2004/0008640 A1  Jan. 15, 2004

Related U.S. Application Data

(63) Continuation-in-part of application No. 09/815,122, filed on Mar. 22, 2001, now Pat. No. 6,836,839.

(51) Int. Cl.
    *H04B 1/707* (2006.01)
(52) U.S. Cl. ........................... 375/148; 375/150
(58) Field of Classification Search ......... 375/142–145, 375/148–150, 152, 343; 370/320, 335, 342, 370/441, 209
    See application file for complete search history.

(56) References Cited

U.S. PATENT DOCUMENTS

| | | | |
|---|---|---|---|
| 5,602,833 A * | 2/1997 | Zehavi | 370/209 |
| 6,249,251 B1 * | 6/2001 | Chang et al. | 342/378 |
| 6,259,725 B1 | 7/2001 | Schilling | |
| 6,421,372 B1 * | 7/2002 | Bierly et al. | 375/143 |
| 2001/0048713 A1 | 12/2001 | Medlock et al. | |
| 2001/0048714 A1 | 12/2001 | Jha | |
| 2001/0050948 A1 | 12/2001 | Ramberg et al. | |
| 2002/0015439 A1 * | 2/2002 | Kohli et al. | 375/148 |
| 2002/0101909 A1 * | 8/2002 | Chen et al. | 375/147 |
| 2004/0057505 A1 * | 3/2004 | Valio | 375/148 |
| 2004/0062300 A1 * | 4/2004 | McDonough et al. | 375/150 |

OTHER PUBLICATIONS

Becker, Jurgen et al.; "An application-tailored dynamically reconfigurable hardware architecture for digital baseband processing"; *IEEE Communications Magazine*; pp. 341-346.

Cummings, Mark and Shiniehiro Haruyama; "FPGA in the software radio"; *IEEE Communications Magazine*; Feb. 1999; pp. 108-112.

\* cited by examiner

*Primary Examiner*—Don N. Vo
(74) *Attorney, Agent, or Firm*—Nixon Peabody LLP

(57) ABSTRACT

A system acquisition module and corresponding method for facilitating PN code searching which has a PN sequence generator configurable to generate a plurality of PN sequences. The module and method also includes computational units configurable to correlate each received signal sample of a plurality of received signal samples with a corresponding PN sequence of the plurality of PN sequences, and further configurable to provide other hardware resources. A number of computational units from the plurality of computational units are selectively configured to correlate the received signal samples with the PN sequences-the number depending upon availability of the plurality of computational units from providing the other hardware resources. In another embodiment, a communication device having a system acquisition function is provided which includes the system acquisition module and a receiver configured to receive signals, where a plurality of configurable computational units are selectively configurable to implement the PN sequence generator.

30 Claims, 6 Drawing Sheets

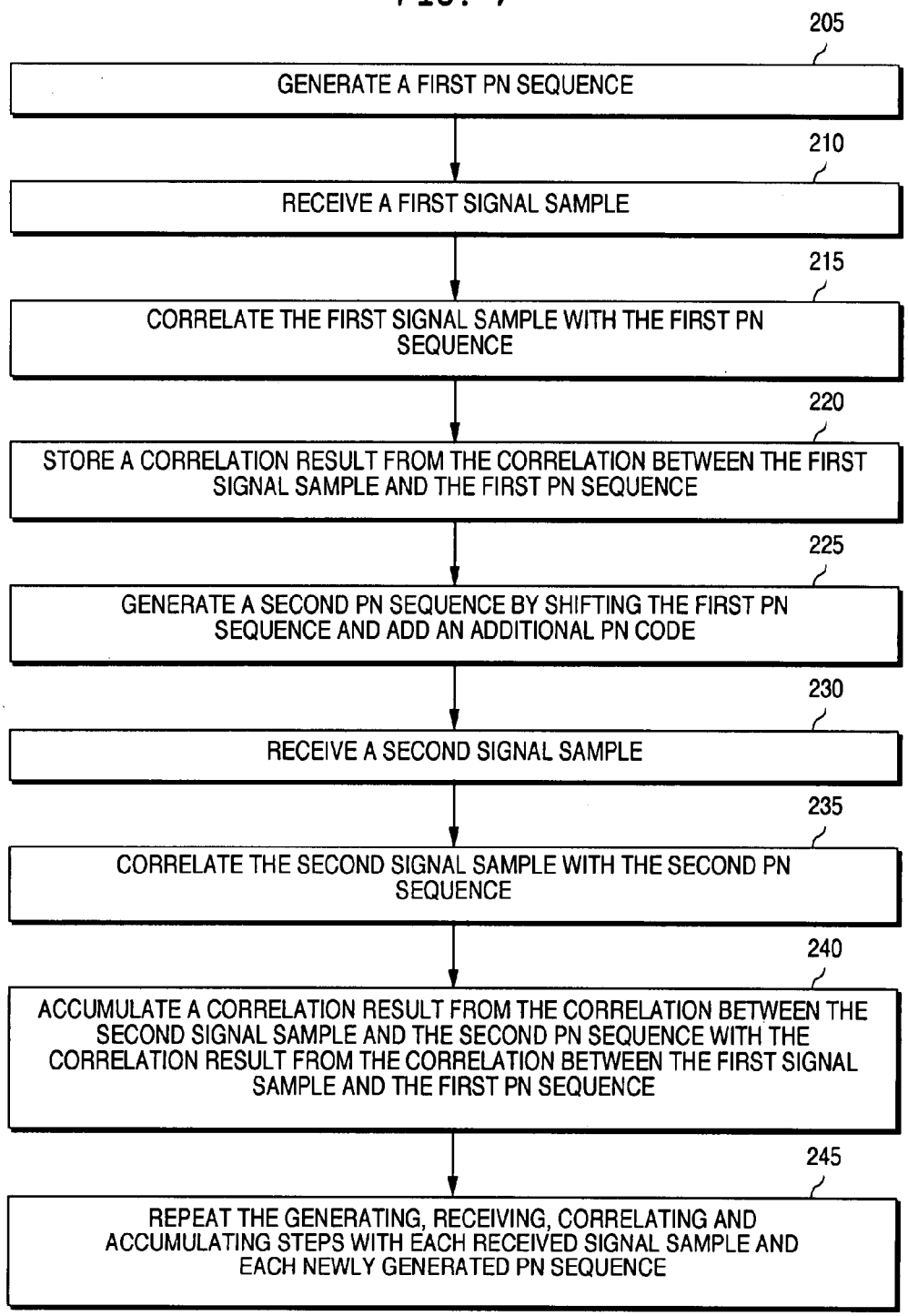

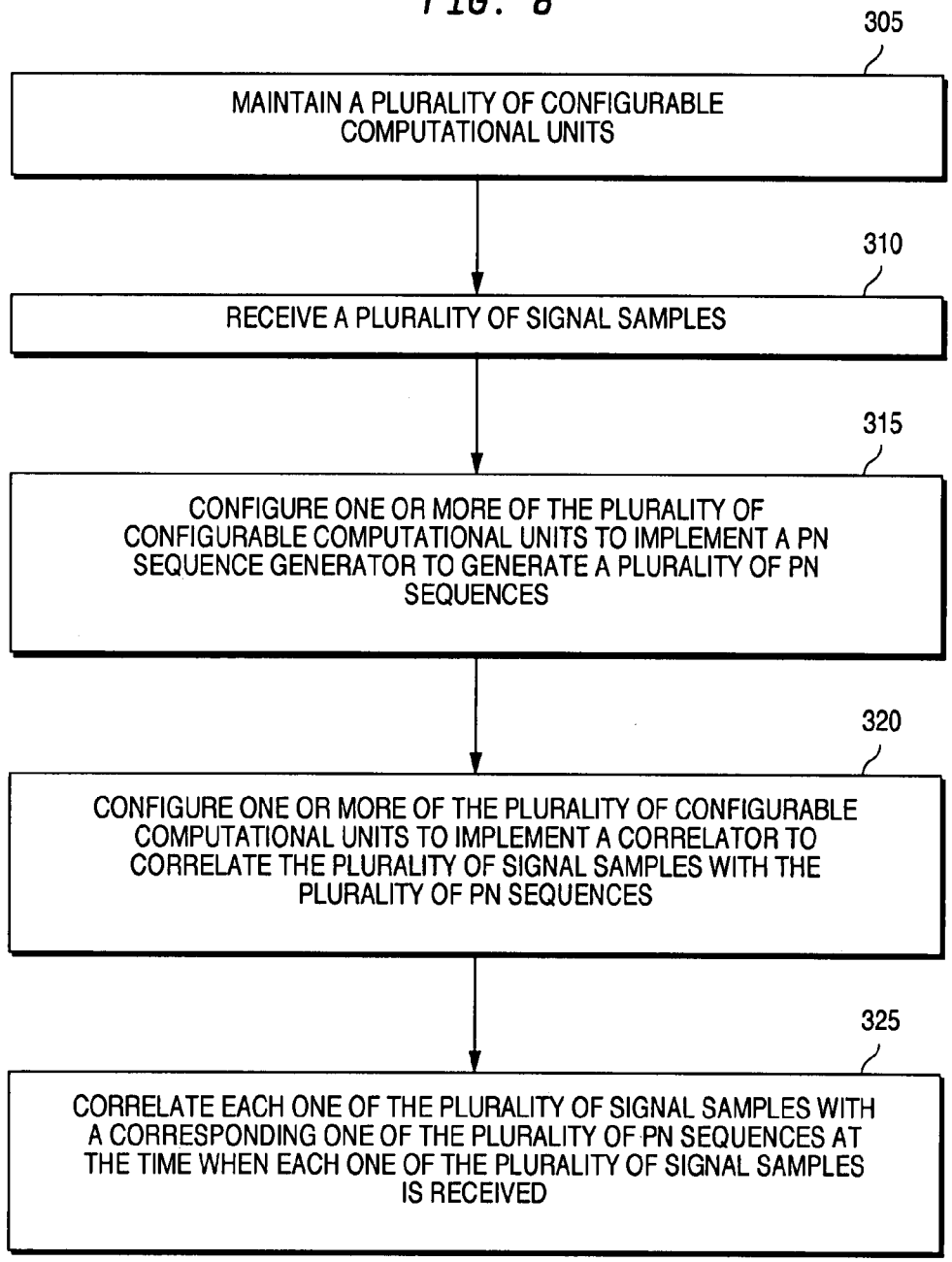

METHOD AND SYSTEM FOR IMPLEMENTING A SYSTEM ACQUISITION FUNCTION FOR USE WITH A COMMUNICATION DEVICE

CROSS-REFERENCES TO RELATED APPLICATION(S)

The present application is a continuation-in-part application of U.S. patent application Ser. No. 09/815,122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001 now U.S. Pat. No. 6,836,839, the disclosure of which is hereby incorporated by reference in their entirety as if set forth in full herein for all purposes.

BACKGROUND OF THE INVENTION

The present invention generally relates to a system acquisition function. More specifically, the present invention relates to a method and system for implementing a system acquisition function for use with a communication device.

In CDMA communication systems, each base station differentiates amongst one another by using an unique PN code. A communication device, such as a mobile phone, is equipped with a system acquisition function, typically embodied in a searcher, to search for and locate the PN codes of the base stations within the vicinity of the mobile phone. Upon power-on, one of the initial tasks of the mobile phone is to find the strongest pilot signal from the nearby base stations as soon as possible. The task of finding the strongest pilot signal is commonly known as system or pilot acquisition and is usually performed by a searcher within the mobile phone.

Under one conventional approach, the system acquisition function within the mobile phone is implemented in the form of the searcher using a serial search technique that only utilizes a set of complex correlators to search for the correlation peak from one PN code offset to another. This approach consumes less power and requires less hardware; however, the search for the correlation peak may take longer.

Under another conventional approach, the searcher within the mobile phone is implemented using a traditional parallel search technique that utilizes several sets of fixed, dedicated correlators to compute the correlation peak in a concurrent manner. This other approach may shorten the search time but it does so at cost of incurring more hardware and power consumption. Furthermore, since the acquisition mode is typically less active than other modes, the exclusive use of fixed, dedicated correlators often results in a waste of hardware resources within the mobile phone.

More specifically, system or pilot acquisition in a CDMA communication system is typically performed as follows. Each base station continually broadcasts its own unique PN code in a periodic manner. One PN code from one base station differs from another PN code from another base station by an offset. Before a PN code can be identified by the mobile phone, the mobile phone first searches for signals at a particular frequency. As a result, only signals from base stations transmitting at that particular frequency are received by the mobile phone.

Next, the PN code of the base station which transmits the strongest pilot signal is identified and synchronized. The mobile phone receives signals from different base stations and these received signals are added up. Typically, the received signals are stored by the mobile phone before the correlation process begins. The mobile phone has a local PN sequence generator which is capable of generating sequences of PN codes. Initially, before the PN code of the base station which transmits the strongest pilot signal is identified, the PN sequence generator generates an initial PN code. This initial PN code is correlated with the received signals by a correlator residing in the mobile phone. Correlation is done to determine the power level of the received signals. The correlation results are examined to determine if the received signals representing the PN code of the transmitting base station fall within an acceptable time delay from the initial PN code to qualify as the strongest pilot signal. If the correlation results are below a predetermined threshold, i.e., the initial PN code generated by the local PN sequence generator does not qualify as the strongest pilot signal, then the local PN sequence generator shifts by one chip to generate another PN code and this other PN code is correlated with the received signals. The generation of PN codes and the correlation of these codes with the received signals continue until the strongest pilot signal is identified.

When the strongest pilot signal is identified, the PN code generated by the PN sequence generator and used to identify the strongest pilot signal is synchronized with the PN code of the base station which transmits the strongest pilot signal. Once the synchronization of the PN code is achieved, the mobile phone is able to communicate with the base station.

Furthermore, after pilot acquisition is completed, the mobile phone continues searching for nearby strong pilot signals and maintains a list to keep track of such signals. This process is commonly called set maintenance. That is, in addition to the strongest pilot signal, the mobile phone also searches for and keeps track of a number of additional pilot signals (and their associated PN codes) with different levels of signal strength. For example, the mobile phone may maintain an active set which keeps track of additional multipaths associated with the pilot signal of the base station that the mobile phone is currently communicating with, a candidate set with pilot signals whose strengths exceed certain threshold, and a neighbor set that includes pilot signals from cells that are in the vicinity of the cells that the mobile phone is communicating with. Maintaining a number of additional pilot signals (and their associated PN codes) facilitates the handoff process. A handoff typically occurs when a mobile phone is roaming from one area to another. This happens when a pilot signal transmitted from another base station is stronger than the one that the mobile phone is currently communicating with. The candidate set may be used to more efficiently identify the new base station transmitting the strongest pilot signal. This is because the strongest pilot signal is more likely to be one of the signals included in the candidate set. Hence, the associated PN code can be retrieved more quickly and communication with the new base station likewise can be established in a shorter period of time.

As can be seen above, the received signals need to be stored by the mobile phone so they can be subsequently used for correlation purposes. Furthermore, generation of the PN codes by the PN sequence generator is done in a sequential manner by shifting the current PN code.

Hence, it would be desirable to provide a method and system to implement a searcher for use with a mobile phone to more efficiently identify the PN code of the base station which transmits the strongest pilot signal.

SUMMARY OF THE INVENTION

A method and system for implementing a system acquisition function for use with a communication device is provided. According to one exemplary embodiment or the system, the system acquisition function is embodied in a searcher. The searcher is embedded in the communication device, such as, a mobile phone. The searcher includes one or more computational units which are used to perform a PN sequence generation function to generate PN sequences. Each PN sequence is comprised of a number of PN chips. The searcher further includes a number of computational units which are used to correlate received signal samples with the PN chips generated by the PN sequence generation function. As each signal sample is received by the communication device, the received signal sample is correlated (complex multiplied) with a PN sequence in a parallel manner using the computational units. The sample correlation results are then respectively accumulated within each computational unit that conducts the corresponding sample correlation. As the next signal sample Is received, this newly received signal sample is similarly correlated with the next PN sequence in a parallel manner. Likewise, the sample correlation results are also accumulated. The foregoing process is repeated until all the signal samples needed to complete a signal correlation are received and correlated with the PN sequences. the number of PN chips within a PN sequence used to correlate with each received signal sample is equivalent to a correlation length chosen such that the correlation results between each received signal sample and the locally generated PN sequence are sufficiently reliable to determine whether the strongest pilot is found.

According to another aspect of the system, the computational units are implemented using adaptive hardware resources. The number of computational units which are used to implement the PN sequence generation function and the correlation function are adjustable depending on, for example, the amount of available adaptive hardware resources.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 7 is a flow diagram illustrating a first exemplary method embodiment in accordance with the present invention; and FIG. 8 is a flow diagram illustrating a second exemplary method embodiment in accordance with the present invention.

DETAILED DESCRIPTION OF THE INVENTION

Figure 1:
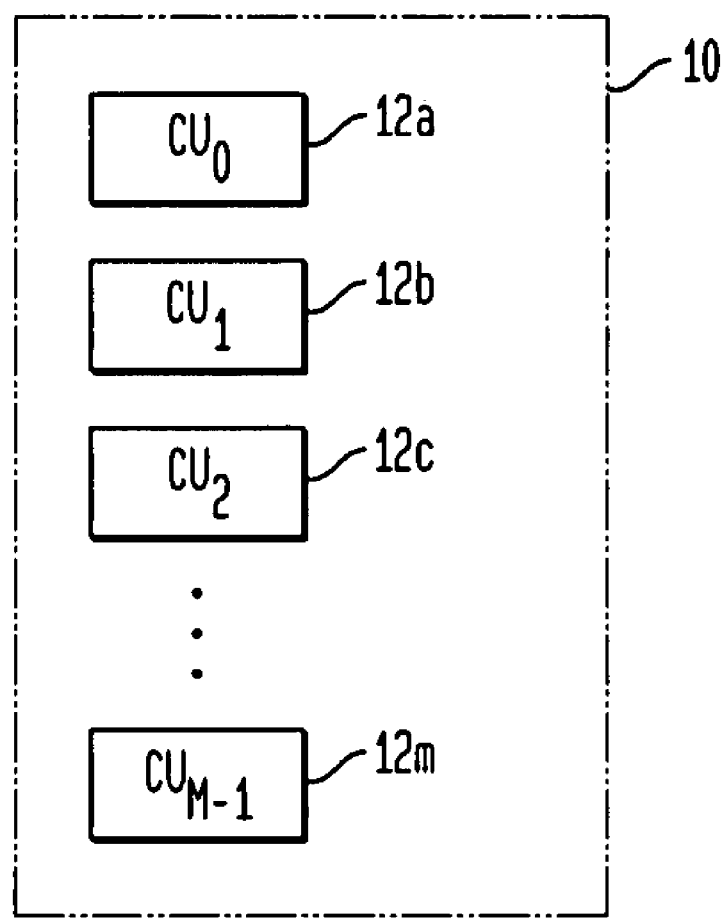
FIG. 1 is a simplified diagram illustrating an exemplary embodiment of an M-node having four (4) computational units in accordance with the present invention.

The present invention in the form of one or more exemplary embodiments will now be described. FIG. 1 is a simplified diagram illustrating an exemplary embodiment of the present invention. Referring to FIG. 1, there is shown a searcher 10 having a number of computational units 12*a-m*. The searcher 10 can be located in any type of communication device, such as a mobile phone. As will be further demonstrated below, each computational unit 12*a-m* correlates the received signal samples with a corresponding PN code. In an exemplary embodiment, these computational units 12*a-m* are implemented using reconfigurable hardware resources within an adaptive computing architecture. Details relating to the adaptive computing architecture and how reconfigurable hardware resources are used to implement functions on an on-demand basis are disclosed in U.S. patent application Ser. No. 09/815, 122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in fall herein for all purposes. It should be understood that while the present invention is described as being in the searcher 10, it will be appreciated by a person of ordinary skill in the art that the present invention can be implemented in other manners within a communication device. For example, some or all of the functionality of the present invention as described herein may be implemented outside of the searcher 10 in other parts of the communication device.

In an exemplary embodiment, the computational units 12*a-m* are arranged in a sequential order and configured to calculate the correlations between the received signal samples and a number of PN sequences. The start of any two adjacent PN sequences are offset by one chip. More specifically, the computational units 12*a-m* correlate each received signal sample with their corresponding components of a PN sequence in a parallel manner.

The PN sequences used by the computational units 12*a-m* are generated in a successive, offset order. The starting position of each successive PN sequence is only one chip off front the preceding PN sequence. The PN chips of each PN sequence can be provided to the computational units 12*a-m* in a number of ways. For example, the PN codes chips can be generated by either a PN sequence generator implemented in the form of another computational unit (not shown) or a RISC processor. As will be described further below, each PN chip is shifted into a corresponding computational unit 12*a-m*. Each computational unit 12*a-m* includes a local memory for storing its corresponding PN chip.

Figure 2:
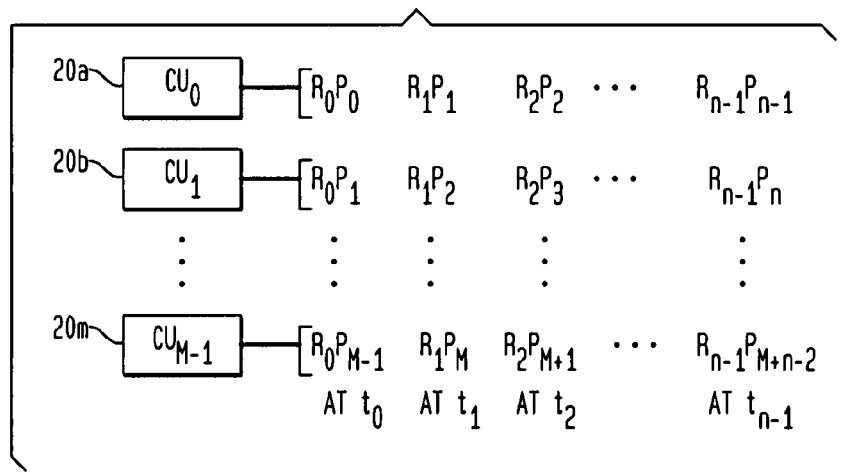
FIG. 2 is a simplified diagram illustrating an exemplary method for performing correlations in accordance with the present invention.

FIG. 2 illustrates an exemplary method for performing correlations in accordance with the present invention. Assume the time duration of a received signal sample is $T_d$, that is, one signal sample is received every $T_d$. Then, conversely, the frequency of the received signal sample is $1/T_d = f_d$.

Referring to FIG. 2, there are m computational units 20*a-m* within the searcher 10. At time $t_o$, signal sample $R_0$ is received by a receiver (not shown) located within the communication device. Signal sample $R_0$ is then correlated with the PN sequence, $P_0P_1 \ldots P_{M-1}$. The PN sequence, $P_0P_1 \ldots P_{M-1}$, is generated by a PN sequence generator (shown in FIG. 6) located within the communication device. Since there are M PN chips within the PN sequence, M computational units 20a-m are used to do the correlations in parallel. Hence, each computational unit 20a-m correlates the signal sample $R_0$ with one PN chip. For example, computational unit 20a correlates $R_0$ with $P_0$ to generate correlation result $R_0 P_0$. The collective correlation results generated by the computational units 20a-m are as follows: $R_0 P_0, R_0 P_1, \ldots, R_0 P_{M-1}$. The correlations are performed and the correlation results are respectively accumulated into the computational units 20a-m before the next signal sample $R_1$ is received at time $t_1$. The signal sample $R_0$ may then be discarded after the correlations are performed.

At time $t_1$, signal sample $R_1$ is received. Signal sample $R_1$ is then correlated with a second PN sequence, $P_1P_2 \ldots P_M$. The PN sequence, $P_1P_2 \ldots P_M$, is only a shift of the PN sequence used at lime to plus a newly generated PN chip $P_M$. That is, the start or the new PN sequence is offset by one chip from the preceding PN sequence. Consequently, the new PN sequence can be supplied to or propagated through the computational units 20a-m as follows. Except for the last computational unit 20m, each computational unit 20a-1 receives its corresponding PN chip for the next correlation from its neighbor. The last computational unit 20m receives its corresponding PN code $P_M$ from the PN sequence generator. In other words, except for the first computational unit 20a, each remaining computational unit 20b-m passes its current PN code chip to its neighbor in the same direction. As to the first computational unit 20a, its current PN chip is discarded; and as to the last computational unit 20m, as mentioned above, the PN sequence generator provides the next PN chip. For example, after the correlations are completed for the received signal sample $R_0$ (which is some time before time $t_1$). computational unit 20a discards its current PN chip $P_0$ and receives its next PN chip (which will be $P_1$) from computational unit 20b; computational unit 20m passes its current PN chip $P_{M-1}$ to its neighboring computational unit 201 (not shown) and receives, its next PN chip $P_M$ from the PN sequence generator; and the remaining computational units 20b-l pass their current PN chips respectively to their neighbors in one direction and receive their next PN chips respectively from their neighbors in the other direction.

Again, since there are M PN codes within a PN sequence, M computational units 20a-m are used to do the correlations in parallel. This time around, the collective correlation results generated by the computational units 20a-m are as follows: $R_1P_1, R_1P_2, \ldots, R_1P_M$. The correlations are performed and the results are accumulated with the correlation results that were done at time to before the next signal sample $R_2$ is received at time $t_2$. Hence, for example, before time $t_2$, computational unit 20a contains correlation results $R_0P_0$ and $R_1P_1$. The foregoing process is repeated until the last signal sample $R_{n-1}$ is received at time $t_{n-1}$ and then correlated with the PN sequence, $P_{n-1}P_n \ldots P_{M+n-2}$ generating the following collective correlation results: $R_{n-1}P_{n-1}, R_{n-1}P_n, \ldots, R_{n-1}P_{M+n-2}$.

At the end of the time period, $t_{n-1}+T_d$, the correlation results for the received signal samples, $R_0R_1 \ldots R_{n-1}$, with n different PN sequences that are offset by one chip between the start of any two adjacent PN sequences, are then obtained. For example, $R_0P_0+R_1P_1+\ldots+R_{n-1}P_{n-1}$ represent the correlation results accumulated at computational unit 20a. Also, at the end of the time period, $t_{n-1}+T_d$, M different PN code offsets have been searched. If the number of PN codes that need to be searched is M or fewer, then the entire search process is completed at the end of the time period $t_{n-1}+T_d$.

Figure 3:
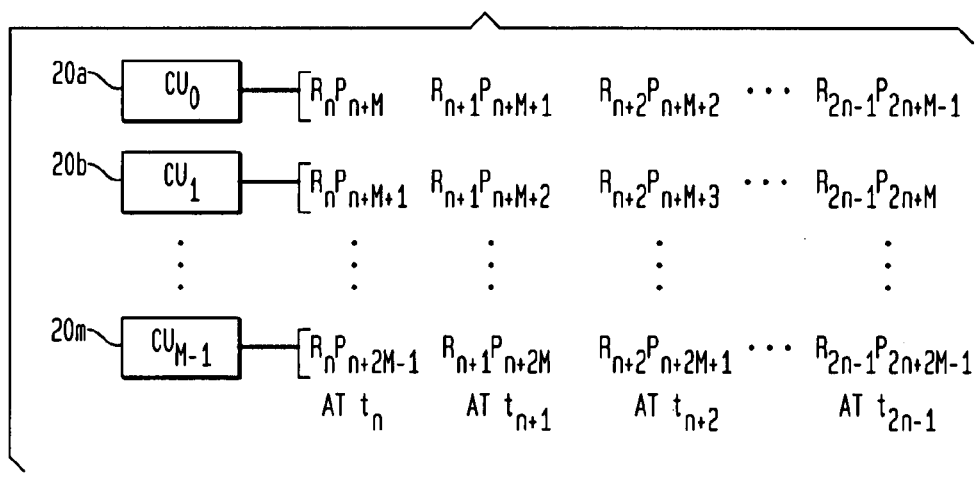
FIG. 3 is a simplified diagram illustrating the exemplary method as shown in FIG. 2 for performing an additional round of correlations in accordance with the present invention.

If the number of PN codes that need to be searched is more than M, then a second round of search or correlations (or additional rounds if necessary) may be performed. The length (time-wise) of a round of correlations is the time period $t_{n-1}+T_d$. For example, FIG. 3 illustrates this second round of correlations. Before the second round of correlations begins, the accumulated correlation results in each of the computational unit 20a-m are transferred and stored in other memory locations and then cleared. Referring to FIG. 3, in the second round of correlations, the received signal sample $R_n$ is correlated by the computational units 20a-m with the PN sequence, $P_{n+M}P_{n+M+1} \ldots P_{n+2M-1}$ at time $t_n$. The correlation results are then accumulated at each of the computational unit 20-a-m.

At time $t_{n+1}$, the signal sample $R_{n+1}$, is correlated with the next PN sequence, $P_{n+M+1}P_{n+M+2} \ldots P_{n+2M}$. Similarly, the start of this next PN sequence is offset from the preceding PN sequence by one chip and a new PN chip is added at the end. This process will continue until the second round of correlations is completed. For the second round of real-time correlations, another M PN offsets ($P_M, P_{M+1}, \ldots, P_{2M+1}$) are searched. The correlation results are then stored and cleared from each computational unit 20a-m before the next round of correlations starts.

According to the exemplary method shown in FIG. 2, all the received signal samples $R_x$ are not stored first and then later used for correlation purposes. Instead, as each signal sample $R_x$ is received, the signal sample $R_x$ is correlated with M PN codes and then accumulated. The collective correlation results for all the received signal samples $R_x$ are then examined to identify the PN sequence which corresponds to the strongest pilot signal. Hence, the collective correlation results for the received signal samples $R_x$ can be derived much faster. In addition, since all the received signal samples $R_x$ need not be stored before the correlation function is performed, the memory overhead and hardware requirements and costs correspondingly become less.

As can be seen from FIG. 2, for each time period $T_d$, M computational units 20a-m are used to correlate a received signal sample $R_x$ with a PN sequence which has M PN codes. For each time period $T_d$, each computational unit 20a-m performs one correlation. As a result, with M computational units 20a-m, M correlations are collectively performed. As will be further described below, the number of computational units 20a-m which are used to perform the correlations is scalable. That is, the number of computational units 20a-m may vary depending on the amount of hardware resources available and the clock rate that is used to drive each computational unit.

Referring back to FIG. 2, for each time period $T_d$ and a PN sequence with M PN codes, each computational unit performs one correlation thereby resulting in M correlations being performed. However, each computational unit is not necessarily restricted to performing one correlation during each time period $T_d$.

Figure 4:
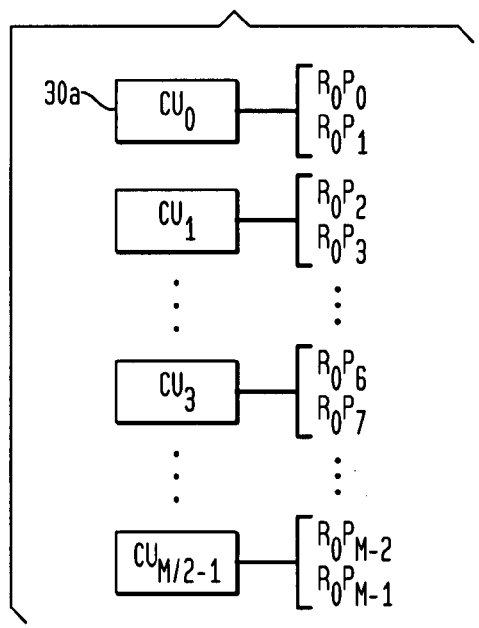
FIG. 4 is a simplified diagram illustrating a second exemplary method for performing correlations in accordance with the present invention.

Each computational unit may perform two or more correlations per time period $T_d$. While M correlations are to be performed per time period $T_d$, these M correlations may be collectively performed by a fewer number of computational units. For example, referring to FIG. 4, there are M/2 computational units. In this case, each of the M/2 computational units is driven to perform two (2) correlations within the time period $T_d$; for instance, computational unit 30a performs two (2) correlations and generates correlation results $R_0P_0$ and $R_0P_1$. In order to perform two (2) correlations with the time period $T_d$, each computational unit is driven at a higher clock rate to increase the speed of execution.

Figure 5:
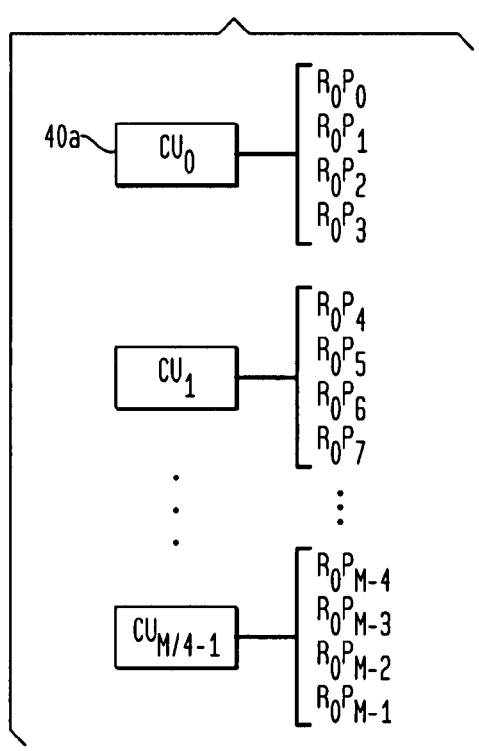
FIG. 5 is a simplified diagram illustrating a third exemplary method for performing correlations in accordance with the present invention.

In another example, as shown in FIG. 5, there are M/4 computational units. In this case, each of the M/4 computational units is driven to perform four (4) correlations within the time period $T_d$; for instance, computational unit 40a performs four (4) correlations and generates correlation results $R_0P_0$, $R_0P_1$, $R_0P_2$ and $R_0P_3$. In order to perform four (4) correlations with the time period $T_d$, each computational unit is driven at an even higher clock rate to increase the speed of execution.

At time $t_{n+1}$, the signal sample $R_{n+1}$, is correlated with the next PN sequence, $P_{n+M+1}P_{n+M+2} \ldots P_{n+2M}$. Similarly, the start of this next PN sequence is offset from the preceding PN sequence by one chip and a new PN chip is added at the end. This process will continue until the second round of correlations is completed. For the second round of real-time correlations, another M PN offsets ($P_M$, $P_{M+1}$, ..., $P_{2M+1}$) are searched. The correlation results are then stored and cleared from each computational unit 20a-m before the next round of correlations starts.

Figure 6:
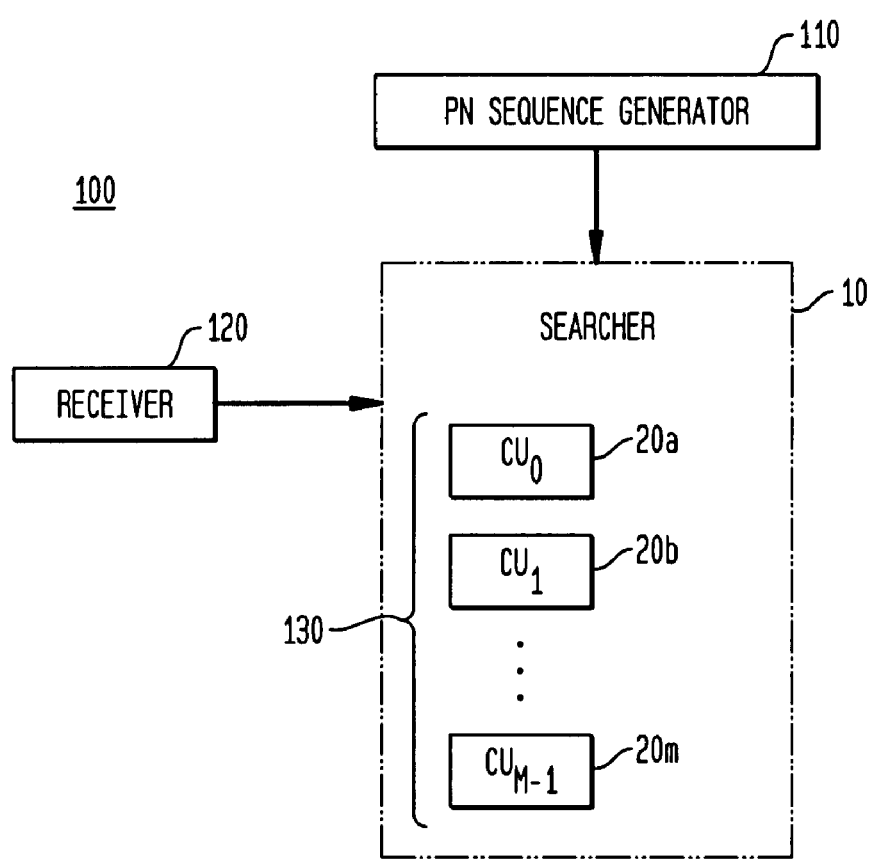
FIG. 6 is a block diagram illustrating an exemplary system embodiment in accordance with the present invention.

FIG. 6 is a block diagram illustrating an exemplary system 100 embodiment in accordance with the present invention. As illustrated, an exemplary system 100, for implementing a system acquisition function to facilitate PN code searching, comprises: a PN sequence generator 110 configured to generate a plurality of PN sequences; and a searcher 10 having a plurality of computational units 20a-20m forming a correlator 130 and configurable to correlate a received signal sample (from receiver 120) with a PN sequence generated by the PN sequence generator, the correlations being executed in a parallel manner. As discussed above, the plurality of PN sequences are generated in a sequential manner; the plurality of PN sequences includes a first PN sequence and a second PN sequence, the second PN sequence immediately following the first PN sequence; and the start of the second PN sequence is determined by shifting the first PN sequence. In addition, a number of computational units from the plurality of computational units are selectively configured to correlate the received signal sample with the PN sequence, with the number of computational units which are selectively configured to correlate the received signal with the PN sequence depending on availability of the plurality of computational units.

FIG. 7 is a flow diagram illustrating a first exemplary method embodiment for implementing a system acquisition function to facilitate PN code searching in accordance with the present invention. The first exemplary method begins with generating a first PN sequence, the first PN sequence being made up of a plurality of PN chips, step 205, and receiving a first signal sample, step 210. The first signal sample is correlated with the first PN sequence upon receiving the first signal sample, step 215, and a correlation result from the correlation between the first signal sample and the first PN sequence is stored, step 220. A second PN sequence is generated by shifting the first PN sequence and adding an additional PN chip, step 225, and a second signal sample is received, step 230. The second signal sample is correlated with the second PN sequence, step 235, and the methodology accumulates a correlation result from the correlation between the second signal sample and the second PN sequence with the correlation result from the correlation between the first signal sample and the first PN sequence, step 240. The method then repeats the above generating, receiving, correlating and accumulating steps with each received signal sample and each newly generated PN sequence, step 245.

FIG. 8 is a flow diagram illustrating a second exemplary method embodiment for implementing a system acquisition function to facilitate PN code searching in accordance with the present invention. The second exemplary method begins with maintaining a plurality or configurable computational units, step 305, and receiving a plurality signal samples, step 310. One or more of the plurality of configurable computational units are configured to implement a PN sequence generator to generate a plurality of PN sequences, step 315. One or more of the plurality of configurable computational units are configured to implement a correlator to correlate the plurality signal samples with the plurality of PN sequences, step 320. Each one or the plurality of signal samples is correlated with a corresponding one of the plurality of PN sequences at the time when each one of the plurality of signal samples is received, step 325. As discussed above, the number of configurable computational units used to implement the correlator depends on availability of the plurality of configurable computational units. In addition, the method may also provide for generating the plurality of PN sequences in a sequential manner, wherein the plurality of PN sequences includes a first PN sequence and second PN sequence, the second PN sequence immediately following the first PN sequence, and wherein the start of the second PN sequence is determined by shifting the first PN sequence.

Based on the disclosure provided herein, a person of ordinary skill in the art should be able to determine the appropriate number of computational units to be used to implement the PN sequence generation function and the correlation function in accordance with the present invention. The number of computational units which can be used depends on a number of factors, such as the availability of the configurable hardware resources, the incoming signal rate or, conversely, the signal period, and the available clock rates, etc. For instance, if only a limited number of computational units can be used, then the clock rate may need to be driven higher in order to perform the requisite number of correlations. Conversely, if additional hardware resources are available, additional computational units driven at a lower clock rate may be implemented to perform the same number of correlations. For another instance, if the signal period is shortened, then additional computational units may be needed to perform the requisite number of correlations within the signal period.

The present invention as described above can also be used to provide more efficient set maintenance. Signals from the base station which previously transmitted the strongest pilot signal can be searched and correlated more quickly to confirm that this base station continues to be the one transmitting the strongest pilot signal. Likewise, signals from the base stations which correspond to the candidate set and the neighbor set respectively can also be searched and correlated more quickly to update the status of the neighbor set and the neighbor set. A candidate set may be searched more frequently than a neighbor set. As a result, the set maintenance update cycle is reduced.

Moreover, while the above disclosure provided above is described in connection with a searcher 10, it should be understood that the present invention is not restricted to use with a searcher and that the present invention is applicable to and can be used with any communication devices which are capable of performing a system acquisition function.

It is understood that the present invention as described above is applicable to a CDMA communication system but that a person of ordinary skill in the art should know of other ways and/or methods to apply the present invention to other types of communication systems.

Furthermore, it is to be understood that the present invention as described above can be implemented in the form of control logic using software, hardware or a combination of both. Based on the disclosure provided herein, a person of ordinary skill in the art will know of other ways and/or methods to implement the present invention.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system acquisition module for facilitating PN code searching, comprising:
   a PN sequence generator configurable to generate a plurality of PN sequences; and
   a plurality of computational units configurable to correlate each received signal sample of a plurality of received signal samples with a corresponding PN sequence of the plurality of PN sequences and further configurable to provide other hardware resources; and
   wherein a number of computational units from the plurality of computational units are selectively configured to correlate the plurality of received signal samples with the plurality of PN sequences, the number of computational units depending upon the availability of the plurality of computational units from providing the other hardware resources.

2. The system acquisition module according to claim 1 wherein the plurality of received signal samples is received in a sequential manner, the plurality of PN sequences is generated in a sequential order, and starting positions of any two adjacent PN sequences are offset by a chip.

3. The system acquisition module according to claim 2 wherein the start of each successive one of the plurality of PN sequences is determined by shifting an immediately preceding one of the PN sequences.

4. The system acquisition module according to claim 2 wherein each of the plurality of received signal samples is correlated with the corresponding one of the plurality of PN sequences as soon as each of the plurality of received signal samples is received.

5. The system acquisition module according to claim 4 wherein, after correlating each received signal sample with a corresponding PN sequence, the received signal sample is discarded.

6. The system acquisition module according to claim 1 wherein each of the plurality of PN sequences has M components; and wherein the number of computational units selectively configured to correlate the plurality of received signal samples with the plurality of PN sequences is M.

7. The system acquisition module according to claim 1 wherein the number of computational units which are selectively configured to correlate the plurality of received signal samples with the plurality of PN sequences is capable of being reduced when a clock rate driving the plurality of computational units is increased.

8. The system acquisition module according to claim 1 wherein the number of computational units which are selectively configured to correlate the plurality of received signal samples with the plurality of PN sequences is capable of being reduced when the availability of the plurality of computational units is reduced.

9. The system acquisition module according to claim 1 wherein the system acquisition module is located in a communication device.

10. The system acquisition module according to claim 9 wherein the communication device is a mobile phone for use in a CDMA communication system.

11. A communication device having a system acquisition function, comprising:
   a receiver configured to receive a plurality of signals;
   a plurality of configurable computational units selectively configurable to implement a PN sequence generator to generate a plurality of PN sequences, a correlator to correlate the plurality of signals with the plurality of PN sequences, and other hardware resources;
   wherein a number of configurable computational units of the plurality of configurable computation units is selectively configured to implement the sequence generator and the correlator, the number of the configurable computational units depending upon availability of the plurality of configurable computational units from providing the other hardware resources.

12. The communication device according to claim 11 wherein:
   the receiver provides the plurality of signals as a plurality of received signal samples is in a sequential manner;
   the plurality of PN sequences is generated in a sequential order; and
   each of the plurality of signal samples is correlated with a corresponding one of the plurality of PN sequences.

13. The communication device according to claim 12 wherein the start of each successive one of the plurality of PN sequences is determined by shifting an immediately preceding one of the PN sequences.

14. The communication device according to claim 12 wherein each of the plurality of signal samples is correlated with the corresponding one of the plurality of PN sequences as soon as the signal sample is received.

15. The communication device according to claim 14 wherein, after correlating each signal sample with a corresponding PN sequence, the signal sample is discarded.

16. The communication device according to claim 11 wherein each of the plurality of PN sequences has M chips and the number of configurable computational units selectively configured to implement the correlator is M or smaller.

17. The communication device according to claim 11 wherein the number of configurable computational units is capable of being reduced when a clock rate driving the plurality of configurable computational units is increased.

18. The communication device according to claim 11 wherein the number of configurable computational units is capable of being reduced when the availability of the plurality of configurable computational units is reduced.

19. The communication device according to claim 11 wherein one or more of the number of configurable computational units are selectively configurable to implement the other hardware resources when not needed to implement the sequence generator or the correlator.

20. The communication device according to claim 11 wherein the communication device is a mobile phone for use in a CDMA communication system.

21. A method for implementing a system acquisition function, comprising:
   receiving a plurality of signals;
   selectively configuring a plurality of configurable computational units for generating a plurality of PN sequences, for correlating the plurality of signals with the plurality of PN sequences, and for providing other hardware resources;

wherein a number of configurable computational units is selectively configured for generating a plurality of PN sequences and for correlating the plurality of signals with the plurality of PN sequences, the number of the configurable computational units depending upon availability of the plurality of configurable computational units from providing the other hardware resources.

22. The method of claim 21 wherein:
the plurality of signals is provided as a plurality of received signal samples in a sequential manner;
the plurality of PN sequences is generated in a sequential order; and
each of the plurality of signal samples is correlated with a corresponding one of the plurality of PN sequences.

23. The method of claim 22 further comprising determining the start of each successive one of the plurality of PN sequences by shifting an immediately preceding one of the PN sequences.

24. The method of claim 23 wherein the correlating comprises correlating each of the plurality of signal samples with the corresponding one of the plurality of PN sequences as soon as the signal sample is received.

25. The method of claim 24 further comprising discarding each signal sample after correlating the signal sample with a corresponding PN sequence.

26. The method of claim 21, wherein each of the plurality of PN sequences has M chips and the number of configurable computational units selectively configured for correlating is M or smaller.

27. The method of claim 21, further comprising increasing the clock rate driving the plurality of configurable computational units and, once the clock rate is increased, reducing the number of configurable computational units.

28. The method of claim 21, further comprising reducing the number of configurable computational units when the availability of the plurality of configurable computational units is reduced.

29. The method of claim 21, selectively configuring one or more of the number of configurable computational units for providing the other hardware resources when not needed for generating the plurality of PN sequences or for correlating the plurality of signals.

30. The method of claim 21, wherein the method is utilized in a mobile phone for use in a CDMA communication system.

* * * * *